United States Patent
Shavell et al.

(10) Patent No.: US 9,781,604 B1
(45) Date of Patent: Oct. 3, 2017

(54) SYSTEMS AND METHODS FOR DETECTING ILLEGITIMATE DEVICES ON WIRELESS NETWORKS

(71) Applicant: Symantec Corporation, Mountain View, CA (US)

(72) Inventors: Michael Shavell, Merrimack, NH (US); Matt Boucher, Merrimack, NH (US); Christopher Robichaud, Belmont, MA (US)

(73) Assignee: Symantec Corporation, Mountain View, CA (US)

( * ) Notice: Subject to any disclaimer, the term of this patent is extended or adjusted under 35 U.S.C. 154(b) by 300 days.

(21) Appl. No.: 14/616,761

(22) Filed: Feb. 9, 2015

(51) Int. Cl.
*H04W 12/12* (2009.01)
*H04M 1/66* (2006.01)
*H04M 1/68* (2006.01)
*H04M 3/16* (2006.01)

(52) U.S. Cl.
CPC .................... *H04W 12/12* (2013.01)

(58) Field of Classification Search
CPC ...................................... H04W 12/12
See application file for complete search history.

(56) References Cited

U.S. PATENT DOCUMENTS

| | | |
|---|---|---|
| 8,191,143 B1 | 5/2012 | Lin et al. |
| 8,606,219 B1 | 12/2013 | Barbee et al. |
| 8,844,041 B1 | 9/2014 | Kienzle et al. |
| 9,420,513 B1 | 8/2016 | Yalagandula et al. |
| 2003/0219008 A1* | 11/2003 | Hrastar ............... H04L 63/1408 370/352 |
| 2003/0233567 A1* | 12/2003 | Lynn ................... H04L 41/0893 726/23 |
| 2004/0117624 A1* | 6/2004 | Brandt ................ H04L 63/1408 713/166 |
| 2004/0236547 A1* | 11/2004 | Rappaport ............ G06F 17/509 703/2 |
| 2006/0193284 A1 | 8/2006 | Stieglitz et al. |
| 2006/0200862 A1* | 9/2006 | Olson ................. H04L 63/1433 726/23 |

(Continued)

OTHER PUBLICATIONS

Michael Shavell, et al; Systems and Methods for Preventing Computing Devices from Sending Wireless Probe Packets; U.S. Appl. No. 14/949,927, filed Nov. 24, 2015.

(Continued)

*Primary Examiner* — Kashif Siddiqui
(74) *Attorney, Agent, or Firm* — FisherBroyles LLP

(57) ABSTRACT

The disclosed computer-implemented method for detecting illegitimate devices on wireless networks may include (1) identifying a baseline signal strength for a wireless network, (2) monitoring a signal strength of the wireless network to obtain at least one additional signal strength measurement, (3) determining that the additional signal strength measurement varies from the baseline signal strength beyond a threshold, (4) determining, in response to determining that the additional signal strength measurement varies from the baseline signal strength, that an illegitimate device is present on the wireless network, and (5) initiating, in response to determining that the illegitimate device is present on the wireless network, a security action. Various other methods, systems, and computer-readable media are also disclosed.

20 Claims, 6 Drawing Sheets

(56) References Cited

U.S. PATENT DOCUMENTS

| | | | |
|---|---|---|---|
| 2007/0079376 A1 | 4/2007 | Robert et al. | |
| 2007/0153763 A1 | 7/2007 | Rampolla et al. | |
| 2007/0283042 A1 | 12/2007 | West et al. | |
| 2010/0172259 A1* | 7/2010 | Aggarwal | H04L 63/1466 370/252 |
| 2010/0207732 A1 | 8/2010 | Patwari et al. | |
| 2012/0304297 A1 | 11/2012 | Chung et al. | |
| 2012/0309420 A1 | 12/2012 | Morgan et al. | |
| 2013/0217358 A1* | 8/2013 | Snider | H04W 12/12 455/411 |
| 2013/0217411 A1 | 8/2013 | Croy et al. | |
| 2014/0201808 A1 | 7/2014 | Yada | |
| 2014/0304770 A1 | 10/2014 | Jung | |
| 2014/0378059 A1 | 12/2014 | Ouchi | |
| 2015/0024787 A1 | 1/2015 | Ben-Itzhak et al. | |
| 2016/0029217 A1 | 1/2016 | Yoo | |
| 2016/0149935 A1 | 5/2016 | Liu et al. | |
| 2016/0192136 A1 | 6/2016 | Pan et al. | |
| 2016/0316426 A1 | 10/2016 | Kumar | |

OTHER PUBLICATIONS

"802.11 WLAN Packet Types", http://www.wildpackets.com/resources/compendium/wireless_lan/wlan_packet_types, as accessed Oct. 14, 2015, (Apr. 15, 2010).
Ankit Kurani; Systems and Methods for Detecting Potentially Illegitimate Wireless Access Points; U.S. Appl. No. 14/732,811, filed Jun. 8, 2015.
"Domain Name System", http://en.wikipedia.org/wiki/Domain_Name_System, as accessed Apr. 6, 2015, Wikipedia, (Jan. 23, 2004).
Mitchell, Bradley "What is a DNS Server?", http://compnetworking.about.com/od/dns_domainnamesystem/f/dns_servers.htm, as accessed Apr. 6, 2015, (Feb. 19, 2007).
"What is the difference between public and private IP addresses?", http://supportcenter.verio.com/KB/questions.php?questionid=655, as accessed Apr. 6, 2015, Verio Inc., (On or before Apr. 6, 2015).
Justin Harmon; Systems and Methods for Detecting Potentially Illegitimate Wireless Access Points; U.S. Appl. No. 14/608,218, filed Jan. 29, 2015.
Michael Shavell, et al; Systems and Methods for Detecting Illegitimate Devices on Wireless Networks; U.S. Appl. No. 14/616,763, filed Feb. 9, 2015.
Justin Harmon; Systems and Methods for Detecting Potentially Illegitimate Wireless Access Points; U.S. Appl. No. 14/625,075, filed Feb. 18, 2015.
Lim, Kwontaek et al., "Scheme of Rogue AP detection in managed WLAN based on AP's location", http://xuebao.nuc.edu.cn/new/english.php?id=85&tid=646, as accessed Dec. 3, 2014, Journal of Measurement Science and Instrumentation, vol. 3 No. 4, Sum No. 12, (Dec. 2012).
Lim, Kwontaek et al., "Scheme of Rogue AP detection in managed WLAN based on AP's location", http://xuebao.nuc.edu.cn/new/uploads/file/jmsi2012-4-370.pdf, as accessed Dec. 3, 2014, Journal of Measurement Science and Instrumentation, vol. 3 No. 4, Sum No. 12, (Dec. 2012), pp. 370-373.
"WiFi Pineapple", https://www.wifipineapple.com/, as accessed Dec. 3, 2014, (Sep. 26, 2011).
"Smart WiFi Toggler", https://play.google.com/store/apps/details?id=com.sebouh00.smartwifitoggler&hl=en, as accessed Dec. 3, 2014, (Dec. 13, 2012).
"Coordinate Distance Calculator", http://boulter.com/gps/distance/?from=38.2500%B0+N%2C+85.7667%B0+W&to=38.0297%B0+N%2C+84.4947%B0+W&units=m, as accessed Dec. 3, 2014, (On or before Dec. 3, 2014).
"802.11 WLAN Packet Types", http://www.wildpackets.com/resources/compendium/wireless_lan/wlan_packet_types, as accessed Dec. 3, 2014, WildPackets, Inc., (Apr. 15, 2010).

"Wireless access point", http://en.wikipedia.org/wiki/Wireless_access_point, as accessed Dec. 3, 2014, Wikipedia, (Apr. 14, 2004).
"Stop connecting to a particular wifi network based on my location", http://android.stackexchange.com/questions/83925/stop-connecting-to-a-particular-wifi-network-based-on-my-location, as accessed Dec. 3, 2014, (Oct. 2, 2014).
"How to block apps on tablet from accessing the Internet while on tethering", http://android.stackexchange.com/questions/63987/how-to-block-apps-on-tablet-from-accessing-the-internet-while-on-tethering, as accessed Dec. 3, 2014, (Feb. 21, 2014).
Cipriani, Jason "Stop Android 4.3 from always scanning for Wi-Fi networks", http://www.cnet.com/how-to/stop-android-4-3-from-always-scanning-for-wi-fi-networks/, as accessed Dec. 3, 2014, (Aug. 2, 2013).
Boubina DR, "How to Disable Wifi Auto Connect on iPhone", https://snapguide.com/guides/disable-wifi-auto-connect-on-iphone/, as accessed Dec. 3, 2014, (Jul. 22, 2012).
"LG G3—WiFi Auto-On Issue", https://support.t-mobile.com/thread/75809, as accessed Dec. 3, 2014, (Aug. 7, 2014).
"Best Practices for Rogue Detection and Annihilation", http://airmagnet.flukenetworks.com/assets/whitepaper/Rogue_Detection_White_Paper.pdf, as accessed Dec. 3, 2014, A Technical Whitepaper, AirMagnet, Inc., (Nov. 2004).
"How do you prevent rogue wireless access points on a network?", http://networkengineering.stackexchange.com/questions/123/how-do-you-prevent-rogue-wireless-access-points-on-a-network, as accessed Dec. 3, 2014, (May 8, 2013).
K. N., Gopinath et al., "All You Wanted to Know About WiFi Rogue Access Points", http://www.rogueap.com/rogue-ap-docs/RogueAP-FAQ.pdf, as accessed Dec. 3, 2014, AirTight Networks, Inc., (2009).
"Rogue access point", http://en.wikipedia.org/wiki/Rogue_access_point, as accessed Dec. 3, 2014, Wikipedia, (Oct. 22, 2005).
"Rogue access points: Preventing, detecting and handling best practices", http://searchnetworking.techtarget.com/Rogue-access-points-Preventing-detecting-and-handling-best-practices, as accessed Dec. 3, 2014, TechTarget, (May 2009).
"Tracking down a rogue access point", http://security.stackexchange.com/questions/10783/tracking-down-a-rogue-access-point, as accessed Dec. 9, 2014, (Jan. 18, 2012).
"Traceroute", https://en.wikipedia.org/wiki/Traceroute, as accessed Dec. 9, 2014, Wikipedia, (Feb. 24, 2004).
Hunt, Troy "The beginners guide to breaking website security with nothing more than a Pineapple", http://www.troyhunt.com/2013/04/the-beginners-guide-to-breaking-website.html, as accessed Dec. 9, 2014, (Apr. 17, 2013).
Michael Shavell, et al.; Systems and Methods for Detecting Illegitimate Devices on Wireless Networks; U.S. Appl. No. 14/617,245, filed Feb. 9, 2015.
"Why don't wifi managers remember mac addresses for hotspots to defeat the jasager attack?", http://security.stackexchange.com/questions/14854/why-dont-wifi-managers-remember-mac-addresses-for-hotspots-to-defeat-the-jasage, as accessed Dec. 9, 2014, (May 10, 2012).
"7. MAC Frame Formats", http://grouper.ieee.org/groups/802/15/pub/2001/Jul01/01292r1 P802-15_TG3-Proposed-Changes-to-Frame-Formats.pdf, as accessed Dec. 9, 2014, (2001).
"Frame check sequence", http://en.wikipedia.org/wiki/Frame_check_sequence, as accessed Dec. 9, 2014, Wikipedia, (Apr. 5, 2005).
"Service set (802.11 network)", http://en.wikipedia.org/wiki/Service_set_%28802.11_network%29, as accessed Dec. 9, 2014, Wikipedia, Jul. 10, 2009.
"Part 11: Wireless LAN Medium Access Control (MAC) and Physical Layer (PHY) Specifications", http://standards.ieee.org/getieee802/download/802.11-2012.pdf, as accessed Dec. 9, 2014, IEEE Std 802.11™-2012 (Revision of IEEE Std 802.11-2007), IEEE Computer Society, New York, (Feb. 6, 2012).
Dai Zovi, Dino A., "KARMA Attacks Radioed Machines Automatically", http://theta44.org/karma/, as accessed Dec. 9, 2014, (Jan. 17, 2006).
Girsas, Paul "Wifi Radar", https://play.google.com/store/apps/details?id=girsas.wifiradar&hl=en, as accessed Jan. 16, 2015, (Dec. 24, 2013).

(56) References Cited

OTHER PUBLICATIONS

"Chapter 6—Configuring Radio Setting", http://www.cisco.com/c/en/us/td/docs/wireless/access_point/12-4_10b_JA/configuration/guide/scg12410b/scg12410b-chap6-radio.html, as accessed Jan. 16, 2015, Cisco, (On or before Sep. 15, 2014).

"Chapter 9—Configuring an Access Point as a Local Authenticator", http://www.cisco.com/c/en/us/td/docs/wireless/access_point/12-4_10b_JA/configuration/guide/scg12410b/scg12410b-chap9-localauth.html, as accessed Jan. 16, 2015, Cisco, (On or before Sep. 6, 2014).

"WLA Series Wireless LAN Access Points", https://www.juniper.net/assets/us/en/local/pdf/datasheets/1000359-en.pdf, as accessed Jan. 16, 2015, Data Sheet, Juniper Networks, Inc., (Jun. 2013).

"Aruba 100 Series Access Points", http://www.arubanetworks.com/assets/ds/DS_AP100Series.pdf, as accessed Jan. 16, 2015, Data Sheet, Aruba Networks, Inc., (On or before Jan. 16, 2015).

Notenboom, Leo A., "How can I block neighboring wireless networks?", http://ask-leo.com/how_can_i_block_neighboring_wireless_networks.html, as accessed Jan. 16, 2015, (Jan. 30, 2007).

Roos, Dave "How Wireless Mesh Networks Work", http://computer.howstuffworks.com/how-wireless-mesh-networks-work.htm, as accessed Jan. 16, 2015, (Dec. 4, 2008).

Leslie, David "Rogue Wireless Access Point Detection and Remediation", http://www.giac.org/paper/gsec/4060/rogue-wireless-access-point-detection-remediation/106460, as accessed Jan. 16, 2015, Global Information Assurance Certification Paper, SANS Institute 2004, (Sep. 9, 2004).

Pacchiano, Ronald "How to Track Down Rogue Wireless Access Points", http://www.smallbusinesscomputing.com/webmaster/article.php/3590656/How-to-Track-Down-Rogue-Wireless-Access-Points.htm, as accessed Jan. 16, 2015, (Mar. 10, 2006).

"Rogue Detection under Unified Wireless Networks", http://www.cisco.com/c/en/us/support/docs/wireless-mobility/wireless-lan-wlan/70987-rogue-detect.html, as accessed Jan. 16, 2015, Document ID: 70987, Cisco, (On or before Sep. 25, 2007).

"Locating Rogue WiFi Access Points", https://www.virtuesecurity.com/blog/locating-rogue-wifi-access-points/, as accessed Jan. 16, 2015, Virtue Security, (Oct. 5, 2013).

"NetSurveyor—802.11 Network Discovery / WiFi Scanner", http://nutsaboutnets.com/netsurveyor-wifi-scanner/, as accessed Jan. 16, 2015, Nuts About Nets, (Nov. 16, 2011).

Michael Shavell, et al; Systems and Methods for Detecting Network Security Deficiencies on Endpoint Devices; U.S. Appl. No. 15/199,149, filed Jun. 30 2016.

Captive portal; https://en.wikipedia.org/wiki/Captive_portal, as accessed May 17, 2016; Wikipedia; (Jan. 25, 2005).

\* cited by examiner

US 9,781,604 B1

SYSTEMS AND METHODS FOR DETECTING ILLEGITIMATE DEVICES ON WIRELESS NETWORKS

BACKGROUND

Wireless networks provide fast and flexible Internet connectivity to many users in a variety of contexts. In office settings, laptop computer users can move from a desk to a conference room to a cafeteria and back without losing connections to the Internet or local network. Public wireless access points provide broadband Internet connections to users of mobile devices in settings such as stores, cafes, mass transit terminals, schools, libraries, and increasingly on buses, trains, and planes.

With the ubiquity of wireless networks comes security concerns. Sensitive data may be transmitted between wireless devices and the wireless access points to which they are connected. Attackers have employed a variety of strategies in attempts to intercept and inspect data transmitted on wireless networks. Many of these strategies involve connecting illegitimate devices to wireless networks to discover and exploit vulnerabilities. Accordingly, the instant disclosure identifies and addresses a need for additional and improved systems and methods for detecting illegitimate devices on wireless networks.

SUMMARY

As will be described in greater detail below, the instant disclosure describes various systems and methods for detecting illegitimate devices on wireless networks by identifying a baseline signal strength for a wireless network, then monitoring the network to identify changes in the network's signal strength that may indicate that an illegitimate device has connected to the wireless network and may be attempting to intercept network traffic. When the presence of an illegitimate device is detected or suspected, systems and methods described herein may initiate appropriate security actions.

In one example, a computer-implemented method for detecting illegitimate devices on wireless networks may include (1) identifying a baseline signal strength for a wireless network, (2) monitoring a signal strength of the wireless network to obtain at least one additional signal strength measurement, (3) determining that the additional signal strength measurement varies from the baseline signal strength beyond a threshold, (4) determining, in response to determining that the additional signal strength measurement varies from the baseline signal strength, that an illegitimate device is present on the wireless network, and (5) initiating, in response to determining that the illegitimate device is present on the wireless network, a security action.

In some examples, identifying the baseline signal strength may include identifying a set of signal strength measurements for the wireless network and calculating a central tendency for the set of signal strength measurements. In one embodiment, the central tendency may include a mean value, a median value, and/or a mode value. In one embodiment, the threshold may include a percentage of the baseline signal strength. In one embodiment, the signal strength may include a Received Signal Strength Indication (RSSI). In some examples, monitoring the signal strength may include obtaining additional signal strength measurements periodically at a predetermined interval.

In one embodiment, the wireless network may be a public wireless network to which the computing device is connected and the illegitimate device may be a malicious device that represents itself as a wireless access point and intercepts network traffic intended for a legitimate wireless access point. In one embodiment, the security action may include (1) alerting a user of the computing device that the illegitimate device is present on the wireless network, (2) disconnecting the computing device from the wireless network, (3) preventing the computing device from connecting to the wireless network, and/or (4) disabling wireless networking on the computing device.

In one embodiment, a system for implementing the above-described method may include several modules stored in memory, such as (1) a baseline module that identifies a baseline signal strength for a wireless network, (2) a monitoring module that monitors a signal strength of the wireless network to obtain at least one additional signal strength measurement, (3) an analysis module that determines that the additional signal strength measurement varies from the baseline signal strength beyond a threshold and determines, in response to determining that the additional signal strength measurement varies from the baseline signal strength, that an illegitimate device is present on the wireless network, and (5) a security module that, in response to determining that the illegitimate device is present on the wireless network, initiates a security action. The system may also include at least one physical processor configured to execute the baseline module, the monitoring module, the analysis module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a baseline signal strength for a wireless network, (2) monitor a signal strength of the wireless network to obtain at least one additional signal strength measurement, (3) determine that the additional signal strength measurement varies from the baseline signal strength beyond a threshold, (4) determine, in response to determining that the additional signal strength measurement varies from the baseline signal strength, that an illegitimate device is present on the wireless network, and (5) in response to determining that the illegitimate device is present on the wireless network, initiate a security action.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
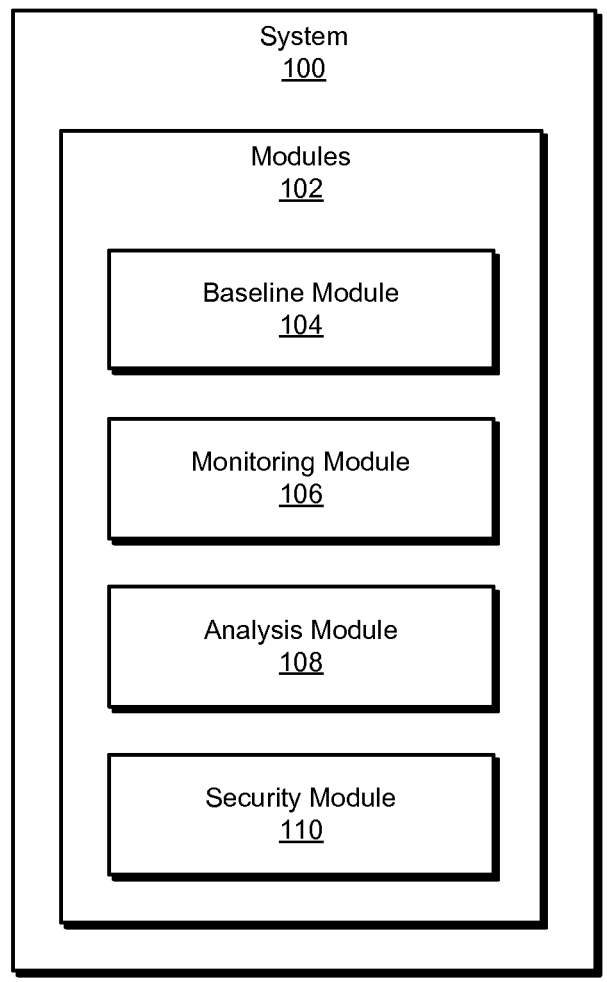
FIG. 1 is a block diagram of an exemplary system for detecting illegitimate devices on wireless networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting illegitimate devices on wireless networks. As will be explained in greater detail below, by detecting variations in the signal strength of a wireless network, systems and methods described herein may detect when an illegitimate device is present on the wireless network and is attempting to intercept data transmitted between computing devices and the wireless access point. Systems and methods described herein may then initiate security actions, such as notifying a user, disconnecting from the compromised network, or disabling wireless networking on the computing device.

Figure 2:
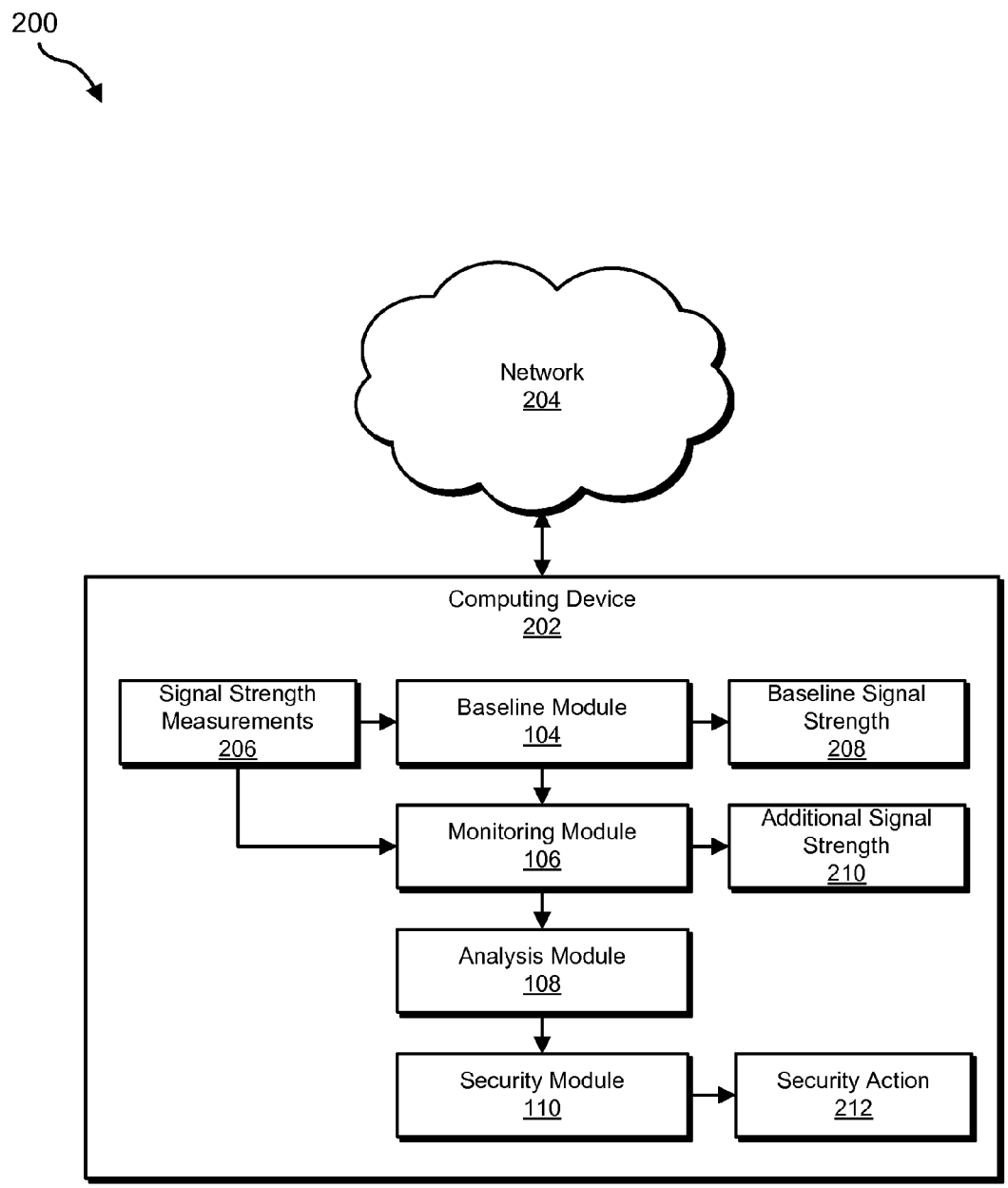
FIG. 2 is a block diagram of an additional exemplary system for detecting illegitimate devices on wireless networks.
Figure 3:
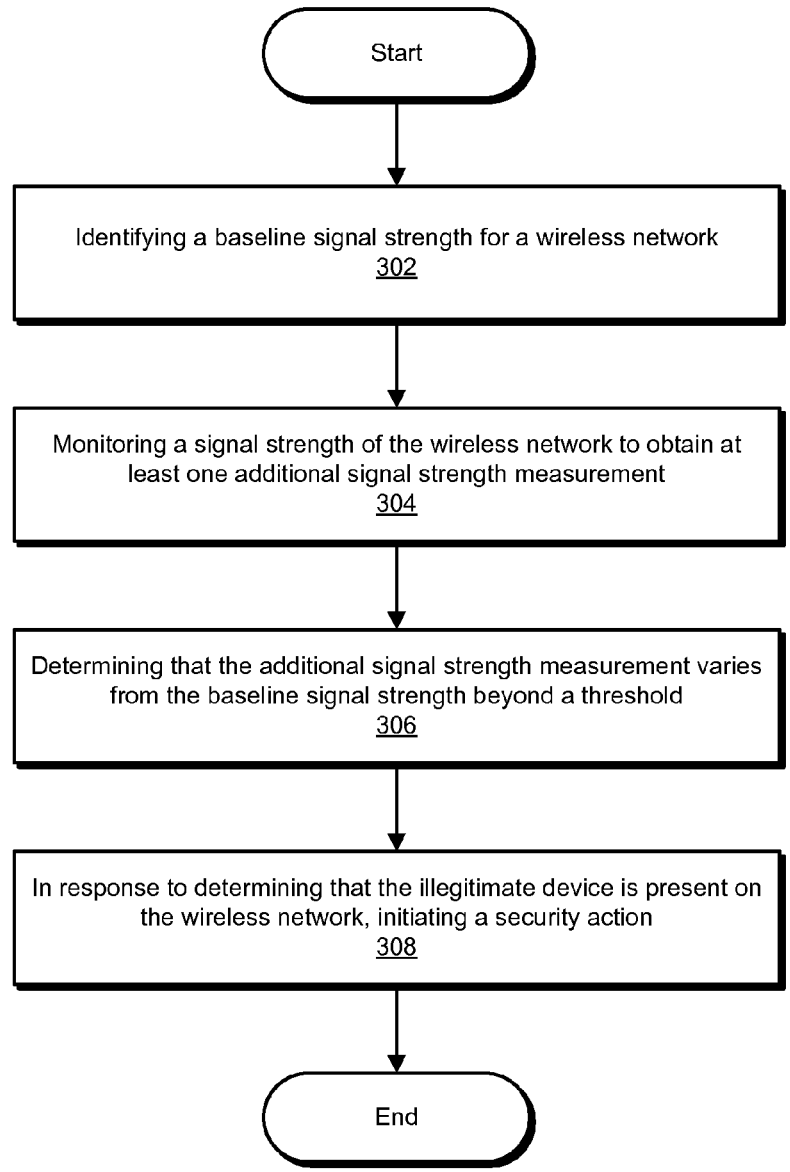
FIG. 3 is a flow diagram of an exemplary method for detecting illegitimate devices on wireless networks.
Figure 4:
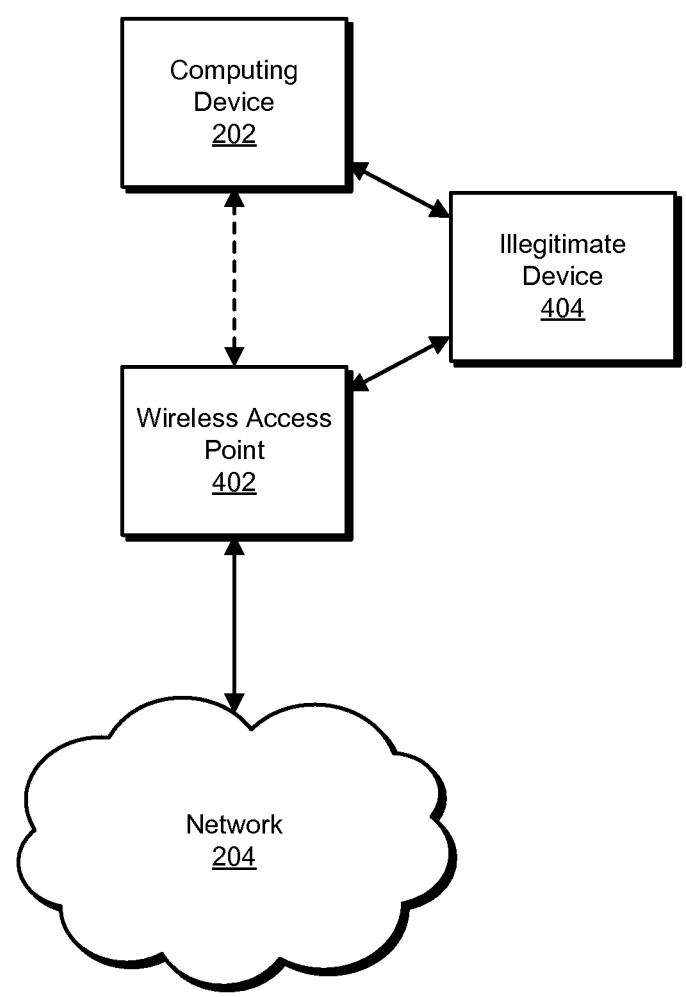
FIG. 4 is a block diagram of a wireless network that includes an illegitimate device.

The following will provide, with reference to FIGS. 1, 2, and 4 detailed descriptions of exemplary systems for detecting illegitimate devices on wireless networks. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting illegitimate devices on wireless networks. As illustrated in this figure, exemplary system 100 may include one or more modules 102 for performing one or more tasks. For example, and as will be explained in greater detail below, exemplary system 100 may also include a baseline module 104 that may identify a baseline signal strength for a wireless network. Exemplary system 100 may additionally include a monitoring module 106 that may monitor a signal strength of the wireless network to obtain at least one additional signal strength measurement. Exemplary system 100 may also include an analysis module 108 that may determine that the additional signal strength measurement varies from the baseline signal strength beyond a threshold. Exemplary system 100 may additionally include a security module 110 that may, in response to determining that the illegitimate device may be present on the wireless network, initiate a security action. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a network 204. For example, computing device 202 may be a mobile computing device, such as a laptop computer, tablet computer, or smartphone, connected to the Internet via a public wireless access point. In one example, computing device 202 may be programmed with one or more of modules 102.

In one embodiment, systems and methods described herein may monitor multiple wireless networks for the presence of illegitimate devices. Since signal strength measurements can be obtained from a wireless network without connecting to the network, systems and methods described herein may enable a computing device to monitor any wireless network where the computing device is in range of the wireless access point. In one embodiment, computing device 202 may be a device configured to monitor several wireless networks concurrently for the presence of illegitimate devices.

In one embodiment, one or more of modules 102 from FIG. 1 may, when executed by at least one processor of computing device 202, enable computing device 202 to detect illegitimate devices on wireless networks. For example, and as will be described in greater detail below, baseline module 104 may identify a baseline signal strength 208 for a wireless network. Monitoring module 106 may monitor a signal strength of the wireless network to obtain at least one additional signal strength measurement 210. Analysis module 108 may determine that additional signal strength 210 varies from baseline signal strength 208 beyond a threshold. Analysis module 108 may determine, in response to determining that additional signal strength 210 varies from baseline signal strength 208, that an illegitimate device is present on the wireless network. Security module 110 may, in response to determining that the illegitimate device is present on the wireless network, initiate a security action 212.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections.

FIG. 3 is a flow diagram of an exemplary computer-implemented method 300 for detecting illegitimate devices on wireless networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a baseline signal strength for a wireless network. For example, baseline module 104 may, as part of computing device 202 in FIG. 2, obtain any number of signal strength measurements 206 to identify baseline signal strength 208 for a wireless network. The term "signal strength," as used herein, generally refers to the measured strength of a wireless network signal received by a wireless antenna in a computing device. Signal strength may be measured in Decibel units referenced to one milliwatt (Decibel-milliwatts, or dBm), with useful wireless network signals falling in the range of −70 dBm to −50 dBm (where a larger magnitude negative number represents a weaker signal strength). Wireless networking devices may convert the physical signal strength measurement to an arbitrary measurement known as Received Signal Strength Indication (RSSI) ranging from 0-100 or 0-127, depending on the manufacturer. Additionally or alternatively, baseline module 104 may use any other suitable metric or mechanism to measure signal strength.

Baseline module 104 may identify a baseline signal strength in a variety of ways. For example, baseline module 104 may call an application programming interface (API) provided by the operating system of the computing device at regular intervals for several seconds (e.g., once per second for 10 seconds) to obtain RSSI measurements from the wireless networking system on the computing device. In one example, baseline module 104 may identify a baseline signal strength by identifying a set of signal strength measurements for the wireless network and by calculating a central tendency for the set of signal strength measurements. In some examples, the central tendency may be a mean value, a median value, or a mode value for the set of signal strength measurements. Since moving a computing device may affect the received signal strength, baseline module 104 executing on a mobile device may receive input from devices such as accelerometers or gyroscopes to determine when the device has been moved, and is response to detecting movement may identify a new baseline signal strength.

At step 304, one or more of the systems described herein may monitor a signal strength of the wireless network to obtain at least one additional signal strength measurement. For example, monitoring module 106 may, as part of computing device 202 in FIG. 2, monitor a signal strength of the wireless network by obtaining signal strength measurements 206 to obtain at least one additional signal strength measurement 210. Monitoring module 106 may obtain at least one additional signal strength measurement in a variety of ways. For example, monitoring module 106 may poll a signal strength API periodically at a predetermined interval (such as every 5 seconds) to obtain additional signal strength measurements.

At step 306, one or more of the systems described herein may determine that the additional signal strength measurement varies from the baseline signal strength beyond a threshold. For example, analysis module 108 may, as part of computing device 202 in FIG. 2, determine that additional signal strength 210 varies from baseline signal strength 208 beyond a threshold.

Analysis module 108 may determine that the additional signal strength measurement varies from the baseline signal strength in a variety of ways. For example, analysis module 108 may determine that the additional signal strength measurement varies from the baseline measurement by a specified value (e.g., 5 dBm). For example, if baseline module 104 determines that the baseline signal strength of a wireless network is −44 dBm and monitoring module 106 identifies an additional signal strength measurement of −53 dBm, analysis module 108 may determine that since the additional signal strength measurement exceeds the baseline measurement by more than the threshold level of 5 dBm. In one embodiment, analysis module 108 may determine that the additional signal strength measurement varies from the baseline measurement by a percentage of the baseline signal strength. For example, analysis module 108 may determine that an additional signal strength measurement of −53 dBm exceeds a baseline level of −44 dBm by more than a threshold level of 10 percent.

In one embodiment, analysis module 108 may reference a sensitivity setting received from a user, configuration file, or registry setting that determines the threshold by which an additional signal strength measurement must vary from the baseline signal strength before analysis module 108 determines that the variance is beyond the threshold. For example, a user may access a control that can be used to set a sensitivity level of "high," "medium," or "low," corresponding to threshold levels of 10 dBm, 6 dBm, and 3 dBm, respectively. In another example, a configuration file or registry setting may contain a sensitivity level representing a threshold value expressed as a percentage of the baseline signal strength or specific dBm value.

At step 308, one or more of the systems described herein may determine, in response to determining that the additional signal strength measurement varies from the baseline signal strength, that an illegitimate device is present on the wireless network. For example, analysis module 108 may, as part of computing device 202 in FIG. 2, determine, in response to determining that additional signal strength 210 varies from baseline signal strength 208 beyond a threshold value, that an illegitimate device is present on the wireless network.

The term "illegitimate device," as used herein, generally refers to any hardware device designed and/or configured to intercept traffic on a wireless network while posing as a legitimate network device. An illegitimate device may monitor, record, and/or alter network traffic. In some embodiments, an illegitimate device may also broadcast a wireless network identifier that duplicates the identifier of a legitimate wireless access point to fool computing devices into connecting to a network via the illegitimate device. Examples of illegitimate devices include a WI-FI PINEAPPLE.

Analysis module 108 may determine that an illegitimate device is present on the wireless network in any suitable manner. In one example, analysis module 108 may determine that the wireless network is a public wireless network to which the computing device is connected and that the detected variance in signal strength represents the presence of a malicious device that represents itself as a wireless access point and intercepts network traffic intended for a legitimate wireless access point. FIG. 4 depicts a system 400 that includes a wireless network that includes an illegitimate device. System 400 may include computing device 202 and network 204 from system 200 in FIG. 2, as well as legitimate wireless access point 402 and illegitimate device 404. Illegitimate device 404 may intercept network traffic from computing device 202 and forward it to wireless access point 402. Intercepting network traffic from computing device 202 may permit illegitimate device 404 to capture sensitive data such as network credentials or credit card numbers.

At step 310, one or more of the systems described herein may, in response to determining that the illegitimate device is present on the wireless network, initiate a security action. For example, security module 110 may, as part of computing device 202 in FIG. 2, in response to determining that the illegitimate device is present on the wireless network, initiate security action 212.

Security module 110 may initiate a security action in a variety of ways and in a variety of contexts. For example, security module 110 may alert a user of the computing device that the illegitimate device is present on the wireless network. Additionally or alternatively, security module 110 may interrupt communication between the computing device and the illegitimate device by disconnecting the computing device from the wireless network, preventing the computing device from connecting to the wireless network, and/or disabling wireless networking on the computing device.

As explained in connection with method 300 above, the systems described herein may detect an illegitimate device on a wireless network. Public wireless networks may be easily exploitable, especially when carrying sensitive traffic that is not encrypted. Devices designed to snoop on wireless network traffic are often designed to be difficult to detect, making securing against them more challenging. Systems and methods described herein may detect illegitimate devices on wireless networks by detecting variations in signal strength when a computing device begins receiving wireless signals from an illegitimate device. By immediately alerting the user that an illegitimate device may be intercepting their traffic on a public wireless network and/or interrupting data communication between the computing device and the illegitimate device, the systems described herein may prevent a user from sending sensitive information over the compromised wireless network and consequently suffering from identity theft or a host of other problems related to stolen personal information.

Figure 5:
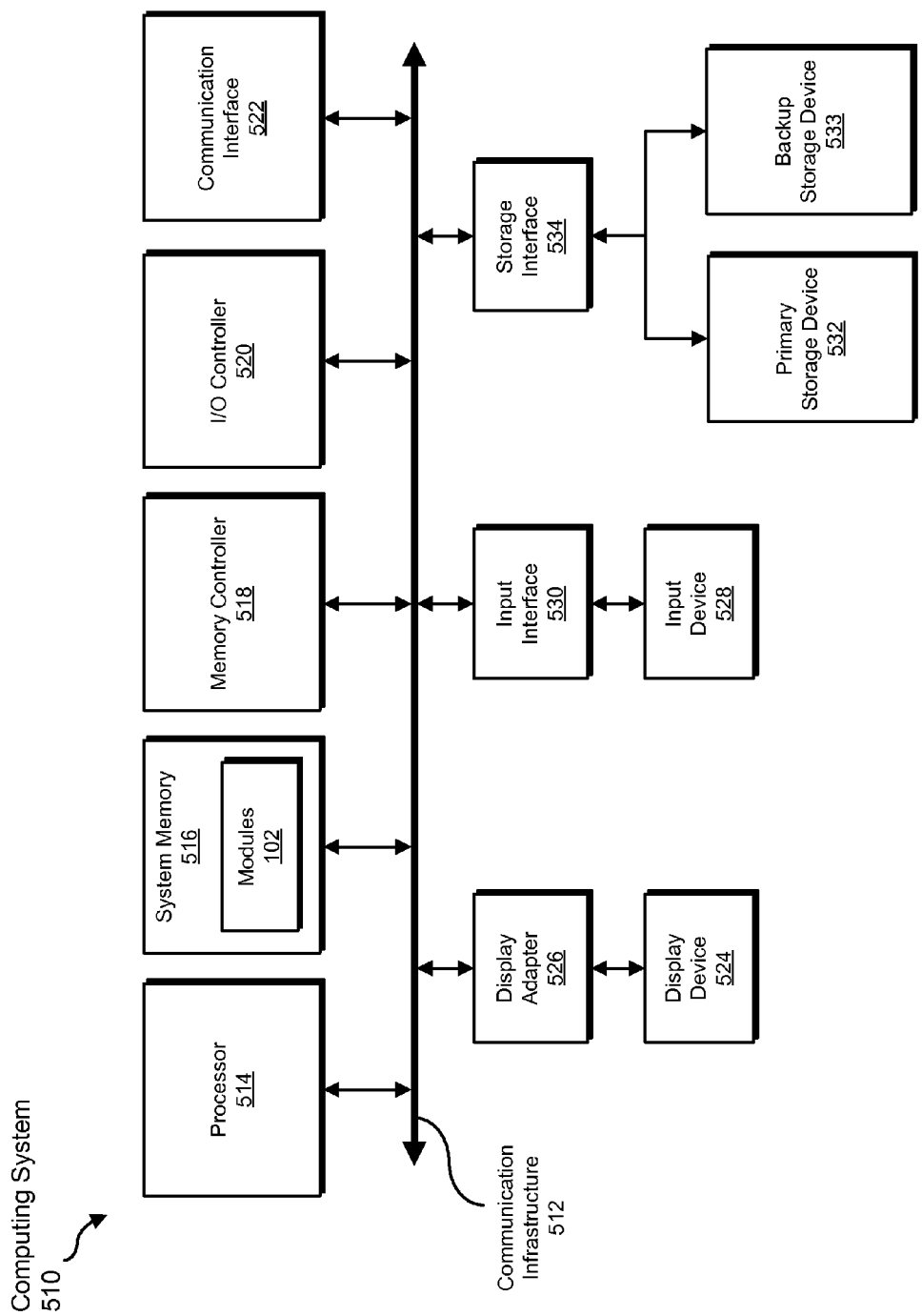
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
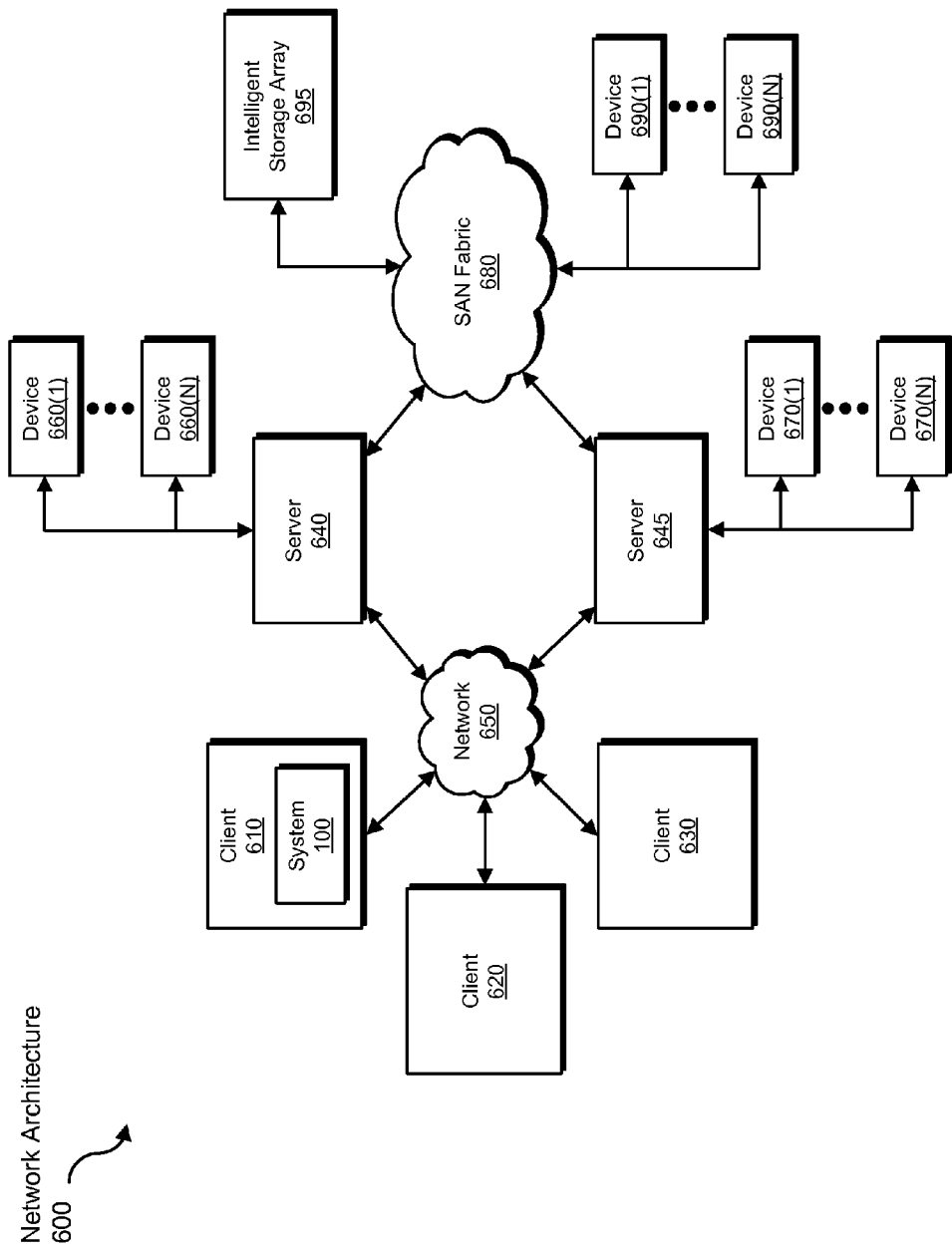
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting illegitimate devices on wireless networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive signal strength measurements from a wireless network to be transformed, transform the signal strength measurements, output a result of the transformation to calculate a baseline signal strength, use the result of the transformation to compare with subsequent signal strength measurements, and store the result of the transformation to determine whether an illegitimate device later connects to the wireless network. One or more of the modules recited herein may transform a computing device to a device to detect illegitimate devices on wireless networks. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting illegitimate devices on wireless networks, at least a portion of the method being performed by a computing device comprising at least one processor, the method comprising:
    identifying, at the computing device, a baseline signal strength for a wireless network;
    detecting, at the computing device, that the computing device has moved;
    identifying, at the computing device, a new baseline signal strength for the wireless network in response to detecting that the computing device has moved;
    monitoring, at the computing device, a signal strength of the wireless network to obtain at least one additional signal strength measurement;
    determining, at the computing device, that the additional signal strength measurement varies from the new baseline signal strength beyond a threshold;
    determining, at the computing device, in response to determining that the additional signal strength measurement varies from the new baseline signal strength, that an illegitimate device is present on the wireless network;
    in response to determining that the illegitimate device is present on the wireless network, initiating, at the computing device, a security action.

2. The computer-implemented method of claim 1, wherein identifying the baseline signal strength comprises:
    identifying a set of signal strength measurements for the wireless network;
    calculating a central tendency for the set of signal strength measurements.

3. The computer-implemented method of claim 2, wherein the central tendency comprises at least one of:
a mean value;
a median value;
a mode value.

4. The computer-implemented method of claim 1, wherein the threshold comprises a percentage of the baseline signal strength.

5. The computer-implemented method of claim 1, wherein the signal strength comprises a Received Signal Strength Indication.

6. The computer-implemented method of claim 1, wherein monitoring the signal strength comprises obtaining the additional signal strength measurement periodically at a predetermined interval.

7. The computer-implemented method of claim 1, wherein:
the wireless network comprises a public wireless network to which the computing device is connected;
the illegitimate device comprises a malicious device that represents itself as a wireless access point and intercepts network traffic intended for a legitimate wireless access point.

8. The computer-implemented method of claim 1, wherein the security action comprises at least one of:
alerting a user of the computing device that the illegitimate device is present on the wireless network;
disconnecting the computing device from the wireless network;
preventing the computing device from connecting to the wireless network;
disabling wireless networking on the computing device.

9. A system for detecting illegitimate devices on wireless networks, the system comprising:
a baseline module, stored in memory, that:
identifies, at a computing device, a baseline signal strength for a wireless network;
detects, at the computing device, that the computing device has moved;
identifies, at the computing device, a new baseline signal strength for the wireless network in response to detecting that the computing device has moved;
a monitoring module, stored in memory, that monitors, at the computing device, a signal strength of the wireless network to obtain at least one additional signal strength measurement;
an analysis module, stored in memory, that:
determines, at the computing device, that the additional signal strength measurement varies from the new baseline signal strength beyond a threshold;
determines, at the computing device, in response to determining that the additional signal strength measurement varies from the new baseline signal strength, that an illegitimate device is present on the wireless network;
a security module, stored in memory, that, in response to determining that the illegitimate device is present on the wireless network, initiates, at the computing device, a security action;
at least one physical processor configured to execute the baseline module, the monitoring module, the analysis module, and the security module.

10. The system of claim 9, wherein the baseline module identifies the baseline signal strength by:
identifying a set of signal strength measurements for the wireless network;
calculating a central tendency for the set of signal strength measurements.

11. The system of claim 10, wherein the central tendency comprises at least one of:
a mean value;
a median value;
a mode value.

12. The system of claim 9, wherein the threshold comprises a percentage of the baseline signal strength.

13. The system of claim 9, wherein the signal strength comprises a Received Signal Strength Indication.

14. The system of claim 9, wherein the monitoring module monitors the signal strength by obtaining the additional signal strength measurement periodically at a predetermined interval.

15. The system of claim 9, wherein:
the wireless network comprises a public wireless network to which the computing device is connected;
the illegitimate device comprises a malicious device that represents itself as a wireless access point and intercepts network traffic intended for a legitimate wireless access point.

16. The system of claim 9, wherein the security action comprises at least one of:
alerting a user of the computing device that the illegitimate device is present on the wireless network;
disconnecting the computing device from the wireless network;
preventing the computing device from connecting to the wireless network;
disabling wireless networking on the computing device.

17. A non-transitory computer-readable medium comprising one or more computer-readable instructions that, when executed by at least one processor of a computing device, cause the computing device to:
identify, at the computing device, a baseline signal strength for a wireless network;
detect, at the computing device, that the computing device has moved;
identify, at the computing device, a new baseline signal strength for the wireless network in response to detecting that the computing device has moved;
monitor, at the computing device, a signal strength of the wireless network to obtain at least one additional signal strength measurement;
determine, at the computing device, that the additional signal strength measurement varies from the baseline signal strength beyond a threshold;
determine, at the computing device, in response to determining that the additional signal strength measurement varies from the baseline signal strength, that an illegitimate device is present on the wireless network;
in response to determining that the illegitimate device is present on the wireless network, initiate, at the computing device, a security action.

18. The non-transitory computer-readable medium of claim 17, wherein the one or more computer-readable instructions cause the computing device to identify the baseline signal strength by:
identifying a set of signal strength measurements for the wireless network;
calculating a central tendency for the set of signal strength measurements.

19. The non-transitory computer-readable medium of claim 18, wherein the central tendency comprises at least one of:
a mean value;
a median value;
a mode value.

20. The non-transitory computer-readable medium of claim 17, wherein the threshold comprises a percentage of the baseline signal strength.

\* \* \* \* \*